May 23, 1933.  L. H. BEVARD  1,910,668
WELDING TOOL
Filed March 12, 1931  3 Sheets-Sheet 1
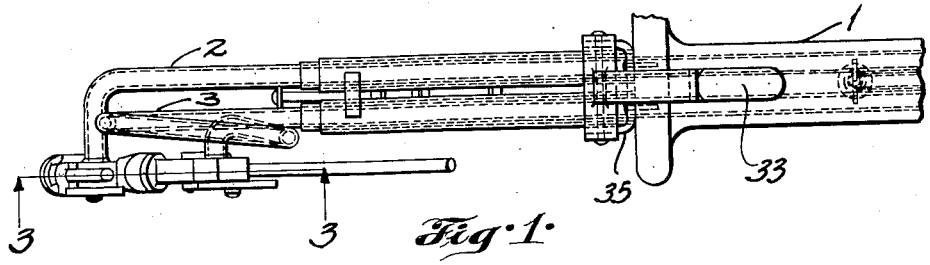
Fig. 1.
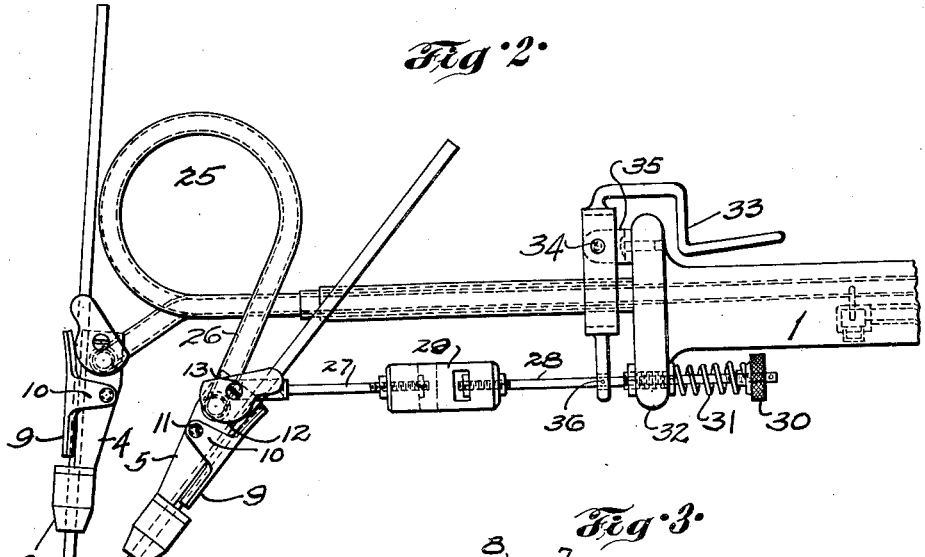
Fig. 2.
Fig. 3.
Fig. 4.  Fig. 5.
Inventor
Lawrence H. Bevard
By Rodney Bedell
Attorney May 23, 1933.  L. H. BEVARD  1,910,668
WELDING TOOL
Filed March 12, 1931   3 Sheets-Sheet 2
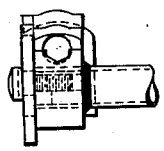
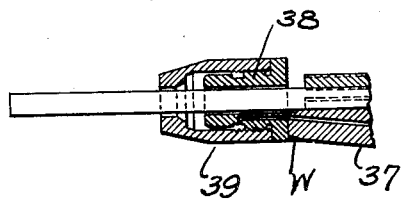
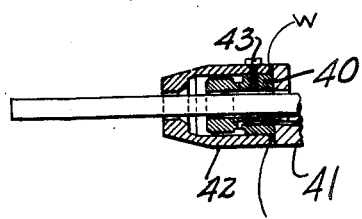
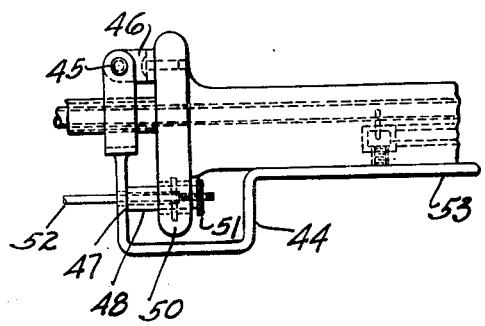
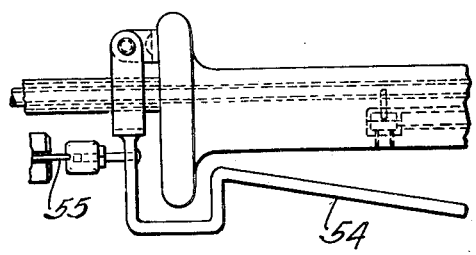
Inventor
Lawrence H Bevard
By Rodney Bevard
Attorney Inventor
Lawrence H Bevard
By Rodney Bedell
Attorney Patented May 23, 1933

1,910,668

UNITED STATES PATENT OFFICE

LAWRENCE H. BEVARD, OF ST. LOUIS, MISSOURI, ASSIGNOR TO GENERAL STEEL CAST-INGS CORPORATION, OF GRANITE CITY, ILLINOIS, A CORPORATION OF DELAWARE

WELDING TOOL

Application filed March 12, 1931. Serial No. 522,128.

The invention relates to the art of welding by means of an electric arc created between the spaced ends of metal electrodes which are consumed and fed towards the arc as they are melted, and more particularly to the type of welding tool in which a stream of hydrogen or other gas envelops the electrode to exclude air from the welded surface.

One object of the invention is to provide means for holding the ends of the electrodes at the required distance from each other and to make it possible for the operator to quickly contact the ends of the electrodes with each other to start or strike the arc.

Another object of the invention is to provide a nozzle or holder for the electrode which will better distribute gases supplied to the electrode and which will permit of a long useful life for the nozzle, notwithstanding its proximity to the heat of the welding operation.

These and other detail objects of the invention are attained in the structures described in the accompanying drawings in which:

Figure 1 is a top view of one form of a welding tool embodying the invention.

Figure 2 is a side view of the same.

Figure 3 is a detail section drawn on an enlarged scale and taken on line 3—3 of Figure 1.

Figure 4 is a detail section taken on line 4—4 of Figure 3.

Figure 5 is a detail section taken on the line 5—5 of Figure 3.

Figures 6 and 7 are respectively an end view and a longitudinal section through a modified form of the electrode holder.

Figure 8 illustrates another modification of the holder structure.

Figure 9 illustrates a modified form of the electrode control.

Figure 10 illustrates another modification of the electrode control.

Figure 11:
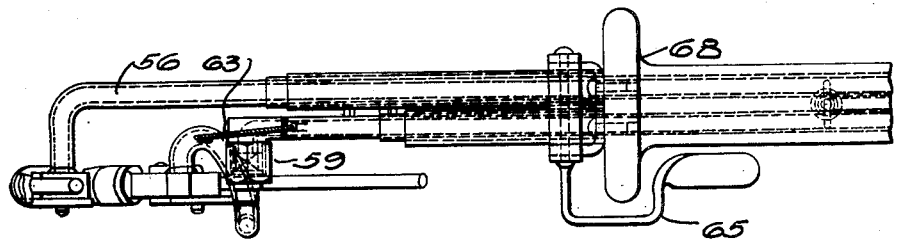
Figure 11 is a top view of another form of the tool.

In the structure shown in Figures 1 to 5, inclusive, the handle 1 is of insulating material and mounts two pipes 2 and 3 which extend from the handle and carry on their outer ends electrode holders 4 and 5 which are substantial duplicates of each other.

Each holder includes a body portion 6 and a forward extension 7 to which extension a sleeve 8 is applied. A clip 9 has lateral ears 10 pivoted at 11 to the body of the holder and the body of the clip co-operates with the adjacent side of the holder to grip the electrode E, the clip being held in electrode gripping position by means of a cam 12 pivoted on the holder at 13.

The holder extension 7 is shouldered to provide an end portion 7a of less diameter than the body of the extension and to provide a rear flange 7b. A channel 14 is cut in the portion 7 and a passageway 15 leads from the end of pipe 3 to groove 14.

The nozzle sleeve 8 is threaded on to the intermediate portion of extension 7 and abuts against the flange 7b. The sleeve 8 projects forwardly beyond the end portion 7a of extension 7 and then terminates in the tip 17 which approaches the electrode and has an opening 18 slightly greater in diameter than the diameter of the electrode. The interior periphery of sleeve 8 is spaced slightly from the exterior periphery of portion 7a of extension 7 to provide a restricted annular passage 16 from groove 14 and the opening in the tip of the sleeve provides a restricted annular discharge passage 18 adapted to direct the gas applied through pipe 3 along the electrode to exclude air from the end of the electrode.

The tip 17 has a blunt thick end and is spaced a substantial distance from the end of extension 7 and serves to insulate the latter from the heat of the welding operation. The passageway 16 permits the gas to flow between the sleeve 8 and end portion 7a and serves to cool the sleeve 8 and end portion 7a. The thickness of the tip serves to prolong its useful life particularly in comparison with the ends of nozzles previously used which terminated in thin edges readily melted down or oxidized when subjected to the heat radiated from the welding arc.

By making sleeve 8 renewable as illustrated, the remainder of the holder can be used for an indefinite period.

Pipe 3 includes a loop 25 which is originally formed with its terminal portion 26 to the left of the position shown. The pipe possesses some elasticity and the terminal portion is held as shown, with the electrodes spaced apart, by means of a tie comprising rods 27 and 28, connected by an insulator 29. The right hand end of rod 28 has a nut 30 threaded thereon and a spring 31 is compressed between nut 30 and the flange 32 on the handle 1. Spring 31 will be strong enough to overcome the thrust of pipe 3—25—26. By adjusting nut 30 the gap between the electrodes may be varied. The thumb lever 33 is pivoted at 34 to a bracket 35 on the handle and the lower end of the lever is pinned at 36 to rod 28. By pressing down on the upper end of the lever, the rod 28 is moved to the left, compressing spring 31 and permitting the electrodes to contact so that the arc may be started.

Figures 6 and 7 illustrate a modification in which the electrode holder 37 has a separately formed extension 38 welded on as indicated at W. The sleeve 39 is threaded on to the extension and serves to protect the latter as in the structure detailed in Figure 3. However, if it is desired to remove the end portion of the holder and apply a new end portion, such renewal may be readily effected.

Figure 8 illustrates another modification in which the holder extension 40 is of smaller diameter than the adjacent end of the holder 41 and welded thereto as indicated at W, and the sleeve 42 abuts against the holder and is secured to extension 40 by means of the screw 43.

Figure 9 illustrates a modification of the operator's control of the position of the electrode in which a lever 44 is pivoted at 45 to a bracket 46 on the end of the handle and bears at 47 against a collar 48 which is slidable in the flange 50 on the end of the handle and has a nut 51 on its end. The collar 48 engages the tie rod 52. The inner end 53 of lever 44 is gripped by the operator's fingers and held against the body of the handle except when the operator desires to strike the arc when the lever is released sufficiently for that purpose.

Figure 10 illustrates another modification in which the space between the electrodes is controlled exclusively by the skill of the operator who will hold lever 54 at the desired point irrespective of any stops or adjustments between the lever and the tie rod 55 which leads to the movable electrode.

Figure 12:
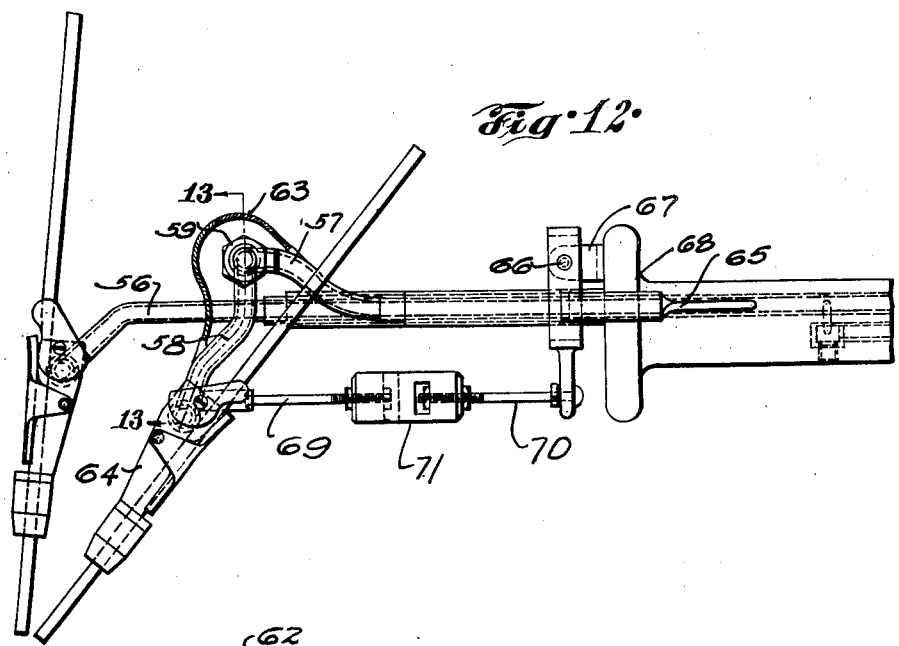
Figure 12 is a side view of the same.
Figure 13:
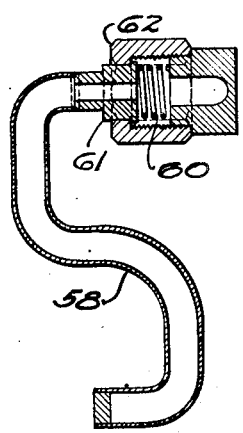
Figure 13 is a transverse section taken on the line 13—13 of Figure 12.

Figures 11, 12 and 13 illustrate another modification in which the spring action of the movable pipe is eliminated. In this construction the pipe 56 is stationary and the other pipe comprises two sections 57 and 58 having a flexible joint indicated at 59 in which the spring 60 thrusts the elements 61 and 62 against each other so as to create sufficient friction to retain the two pipe sections in any relative position to which they may be moved. A cable 63 conducts the current between the two sections.

The electrode holder 64 is adjusted manually by lever 65 pivoted at 66 on bracket 67 on the handle 63 and connected to the holder 64 by the tie rods 69 and 70 connected by the insulator 71. The holder and nozzle may take any of the forms previously described.

Obviously, other variations in details of structure may be made by those skilled in the art without departing from the spirit of my invention and I contemplate the exclusive use of all of such variations as come within the scope of my claims.

I claim:

1. In a welding tool, an electrode holder comprising an electrode mounting portion and a forward extension for surrounding the electrode, the exterior of said extension being off-set, and a sleeve mounted on the part of said extension having the greater diameter and extending forwardly therefrom with its interior surface spaced from the exterior surface of the part of said extension having a smaller diameter to provide an annular passage between said surfaces, there being a gas conduit in said holder in communication with said passage, said sleeve projecting forwardly of the end of said holder and approaching the electrode to protect the end of said holder from the heat of the welding operation and to form a restricted passage for gas along the electrode.

2. In a welding tool, an electrode holder having a forward extension surrounding the electrode, the end portion of said extension having a smaller diameter than the inner portion thereof and there being an annular groove between said end portion and inner portion, a protector sleeve mounted on said inner portion, and a fluid conduit in said holder communicating with the bottom of said groove, said sleeve being spaced from said end portion to form an annular passage with the same serving to distribute the fluid from said conduit intimately around the wall of said protector sleeve.

3. In a welding tool, an electrode holder, a gas passage therein having an annular portion extending around the periphery of said holder near the forward end thereof, and a cup-like member secured to said holder rearwardly of said portion and having a restricted outlet opening in its forward wall for gas and the electrode, said wall being spaced from the front end of said holder to form a chamber and said chamber being wider than said opening and in communication with the annular portion of said passage.

4. In a welding tool, an electrode holder having a forward extension, a gas conduit in said holder including an annular portion extending around the periphery of said extension, and a protector sleeve secured to said extension rearwardly of said portion and extending beyond the forward end of said extension, the wall of said sleeve forming a wall of the annular portion of said conduit and the forward part of said extension serving to maintain the gas intimately in engagement with the wall of said sleeve for cooling purposes.

5. In a welding tool, an electrode holder having a forward extension, a cup-like protector member on said extension, the forward wall of said member having an outlet opening for the electrode and being spaced from the end of said extension to form a chamber therewith of greater width than said opening, and the end part of said extension being spaced from the side wall of said member, and a gas conduit in said holder communicating with said chamber through the space between said extension and the side wall of said member whereby gas is first intimately distributed around said member for cooling purposes and then permitted to pass through said opening around the electrode.

6. In a welding tool, an electrode holder, a cup-like protector member on the tip end of said holder, an electrode mounted in said holder and extending through the forward wall of said member, and means for supplying gas to the arc end of said electrode comprising a gas conduit in said holder, a chamber between the tip end of said holder and the forward wall of said protector member and communicating with said conduit, and an annular opening in said forward wall around said electrode, said chamber serving to collect gas behind said opening and to cause the same to swirl around said electrode and cling thereto in case of clogging of a portion of said opening.

7. In a welding tool, a body portion comprising a pair of separate tubes, electrode holding tips at corresponding extremities thereof, and handle forming structure including portions of said tubes spaced from said tips, one of said tubes being bent between the tip and handle portions to form an elastic mounting for the corresponding electrode.

8. In a welding tool, a body portion comprising a pair of separate continuous tubes, electrode holding tips at corresponding extremities thereof, handle forming structure including portions of said tubes spaced from said tips, one of said tubes being looped between the tip and handle portions to form an elastic mounting for the corresponding electrode, and manually controllable means cooperating with said looped tube for effecting relative movement of the electrodes.

In testimony whereof I hereunto affix my signature this 6th day of March, 1931.

LAWRENCE H. BEVARD.